United States Patent
Wong et al.

(10) Patent No.: US 10,462,079 B2
(45) Date of Patent: Oct. 29, 2019

(54) CONTEXT-AWARE BADGE DISPLAY IN ONLINE COMMUNITIES

(71) Applicant: ADOBE INC., San Jose, CA (US)

(72) Inventors: Calvin K C Wong, Sunnyvale, CA (US); Laurie Byrum, Pleasanton, CA (US); Scott Date, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 284 days.

(21) Appl. No.: 15/423,465

(22) Filed: Feb. 2, 2017

(65) Prior Publication Data
US 2018/0217716 A1 Aug. 2, 2018

(51) Int. Cl.
| | |
|---|---|
| *H04L 12/58* | (2006.01) |
| *G06Q 50/00* | (2012.01) |
| *H04L 29/06* | (2006.01) |
| *A63F 13/537* | (2014.01) |
| *G06Q 30/02* | (2012.01) |
| *A63F 13/79* | (2014.01) |

(52) U.S. Cl.
CPC .......... *H04L 51/046* (2013.01); *G06Q 50/01* (2013.01); *H04L 51/32* (2013.01); *A63F 13/537* (2014.09); *A63F 13/79* (2014.09); *G06Q 30/0269* (2013.01); *H04L 65/403* (2013.01)

(58) Field of Classification Search
CPC .. G06Q 50/01; G06Q 30/0226; G06Q 30/269; A63F 13/537; A63F 13/79; H04L 51/046; H04L 51/32; H04L 65/403; G06F 3/04817
See application file for complete search history.

(56) References Cited

U.S. PATENT DOCUMENTS

| | | | | |
|---|---|---|---|---|
| 8,788,949 B2* | 7/2014 | Hunt | ...................... | G06Q 10/10 709/206 |
| 10,033,536 B2* | 7/2018 | Mercury | ............... | H04L 9/3247 |
| 2008/0222295 A1* | 9/2008 | Robinson | .......... | G06F 17/30867 709/227 |
| 2009/0326970 A1* | 12/2009 | Estrada | .................. | G06Q 30/02 705/1.1 |

(Continued)

OTHER PUBLICATIONS

Open2Study, "Badges", https://www.open2study.com/badges, Archive.org Apr. 23, 2016, pp. 1-3 (Year: 2016).*

*Primary Examiner* — Andrew L Tank
(74) *Attorney, Agent, or Firm* — Brake Hughes Bellermann LLP

(57) ABSTRACT

Systems and techniques that provide context-aware badge display in online communities are disclosed. Badges are identified for display based on the contexts of the online interfaces in which the badges will be displayed. When the badges awarded to a user are to be displayed in a particular online interface, the online community of that online interface is identified and used to display appropriate badges. Badges awarded to the user in the particular online community of the online interface and one or more related online communities are displayed. The related communities are identified based on a hierarchy of communities that identifies relationships between the online communities. Badges can be displayed using different display rules that can be changed over time and vary for different online communities.

16 Claims, 10 Drawing Sheets

BADGE DISPLAY RULE:
ALL BADGES

BADGE DISPLAY RULE:
ALL RELATED BADGES

(56) References Cited

U.S. PATENT DOCUMENTS

| | | | | |
|---|---|---|---|---|
| 2010/0169798 A1* | 7/2010 | Hyndman | ............... | G06F 3/011 |
| | | | | 715/757 |
| 2012/0150759 A1* | 6/2012 | Tarjan | ................... | G06O 50/01 |
| | | | | 705/319 |
| 2012/0290979 A1* | 11/2012 | Devecka | ................. | H04W 4/21 |
| | | | | 715/810 |
| 2012/0296967 A1* | 11/2012 | Tao | .................... | G06Q 709/204 |
| | | | | 709/204 |
| 2013/0086484 A1* | 4/2013 | Antin | .................... | G06Q 10/10 |
| | | | | 715/751 |
| 2013/0262258 A1* | 10/2013 | Jennings | ............ | G06Q 30/0631 |
| | | | | 705/26.4 |
| 2014/0082072 A1* | 3/2014 | Kass | ................ | G06F 17/30867 |
| | | | | 709/204 |
| 2014/0180786 A1* | 6/2014 | Sullivan | ............ | G06Q 30/0226 |
| | | | | 705/14.27 |
| 2014/0181196 A1* | 6/2014 | Sullivan | ................. | H04L 67/22 |
| | | | | 709/204 |
| 2014/0274303 A1* | 9/2014 | Funches | ............ | H04L 29/06034 |
| | | | | 463/23 |
| 2014/0282098 A1* | 9/2014 | McConnell | ........ | G06Q 10/0639 |
| | | | | 715/753 |
| 2014/0289034 A1* | 9/2014 | Wu | .................... | G06O 30/0231 |
| | | | | 705/14.31 |
| 2014/0304787 A1* | 10/2014 | Kurien | ............... | G06Q 10/1053 |
| | | | | 726/6 |
| 2014/0353369 A1* | 12/2014 | Malin | ............. | G06K 19/06037 |
| | | | | 235/375 |
| 2015/0032492 A1* | 1/2015 | Ting | ................. | G06Q 10/06311 |
| | | | | 705/7.14 |
| 2015/0066612 A1* | 3/2015 | Karpoff | .................. | G06Q 50/20 |
| | | | | 705/14.4 |
| 2016/0042653 A1* | 2/2016 | Arsac | ....................... | G09B 5/08 |
| | | | | 434/350 |
| 2016/0151704 A1* | 6/2016 | Wu | ........................ | A63F 13/46 |
| | | | | 463/31 |
| 2017/0046346 A1* | 2/2017 | Zhou | .................... | G06Q 30/02 |

* cited by examiner

BADGE DISPLAY RULE:
ALL BADGES

BADGE DISPLAY RULE:
ALL RELATED BADGES

CONTEXT-AWARE BADGE DISPLAY IN ONLINE COMMUNITIES

TECHNICAL FIELD

This disclosure relates generally to computer-based systems and techniques that support communities of online users and more particularly relates to improving engagement and experiences in those communities.

BACKGROUND

Users in online communities use online interfaces to interact with other users in their communities. Users can access these online interfaces to create discussions, create posts, respond to posts, submit blog entries, share content, add comments, give advice, chat with one another in chat rooms, collaborate on projects, play games together, or participate in virtual worlds together. Online communities often use gamification techniques that reward users in the community with badges based on their roles or participation. For example, a user may be assigned a "moderator" badge reflecting the user's role as a moderator. As another example, a user may earn a "gold" badge based on having submitted at least 100 posts in the online community. The ability to earn badges encourages participation. The badges also allow the users in the online community to recognize the roles and achievements of other users. Badges are often displayed along with a user's interactions in the online interfaces of the online community. For example, when a user with an "expert" badge responds to a question in a website forum, that user's identity and badge appear with the response. This allows other users who view the response to recognize that the response was provided by a user who has an "expert" badge.

Many online communities use a site-level gamification system that displays all of a user's badges for the entire site. This often dilutes the effect and context of user badges, especially on sites with multiple online communities. For example, a user may be awarded a "gold" badge based on participation in a particular online community on a site that includes 5 other online communities. When posting in the other 5 online communities, the user's "gold" badge is misleading regarding the user's interest and expertise in those other online communities. Another problem involves the clutter that occurs when users achieve many badges in the multiple online communities provided by a site. For example, displaying 30 badges from 6 different online communities when the user posts in any of those online communities can be visually overwhelming. With so many badges displayed, other users may not notice, recognize, or appreciate the badges that are relevant to the particular online community. In contrast to site-level gamification, other gamification systems isolate badges to individual online communities. This isolation is also often undesirable since online communities commonly relate to one another and the systems do not display badges from those related online communities.

SUMMARY

Systems and techniques are disclosed that provide context-aware badge display in online communities. Badges are identified for display based on the contexts of the online interfaces in which the badges will be displayed. When the badges awarded to a user are to be displayed in a particular online interface, the online community of that online interface is identified and used to display appropriate badges. Badges awarded to the user in the particular online community of the online interface and one or more related online communities are displayed. The related online communities are identified based on a hierarchy of online communities that identifies relationships between the online communities. This allows an online interface to selectively display only badges that are from its online community and related online communities. Badges can be displayed using different display rules. The badge display rules can be changed over time and vary for different online communities. For example, an online community can initially display all badges awarded to its users in all communities. The online community can later change its badge display rule to display only badges awarded in the online community and badges awarded in related online communities.

One exemplary technique stores badges awarded to a user including badge source information identifying in which online community individual badges were awarded to a user. The technique identifies the context of an online interface in which a representation of the user will be displayed. The context identifies the online community of the online interface. The technique determines another online community that is related to the online community of the online interface based on a hierarchy of online communities. The technique then identifies a set of badges for display with the representation based on the context and the badge source information. This involves identifying badges awarded to the user in the online community and the related online community. The representation and the set of badges are then provided for display in the online interface.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 10 is a block diagram depicting an example of badge display in an online interface of an online community for different badge display rules.

FIG. 11 is a block diagram depicting another example of badge display in an online interface of an online community for different badge display rules.

FIG. 12 is a block diagram depicting another example of badge display in an online interface of an online community for different badge display rules.

DETAILED DESCRIPTION

Figure 1:
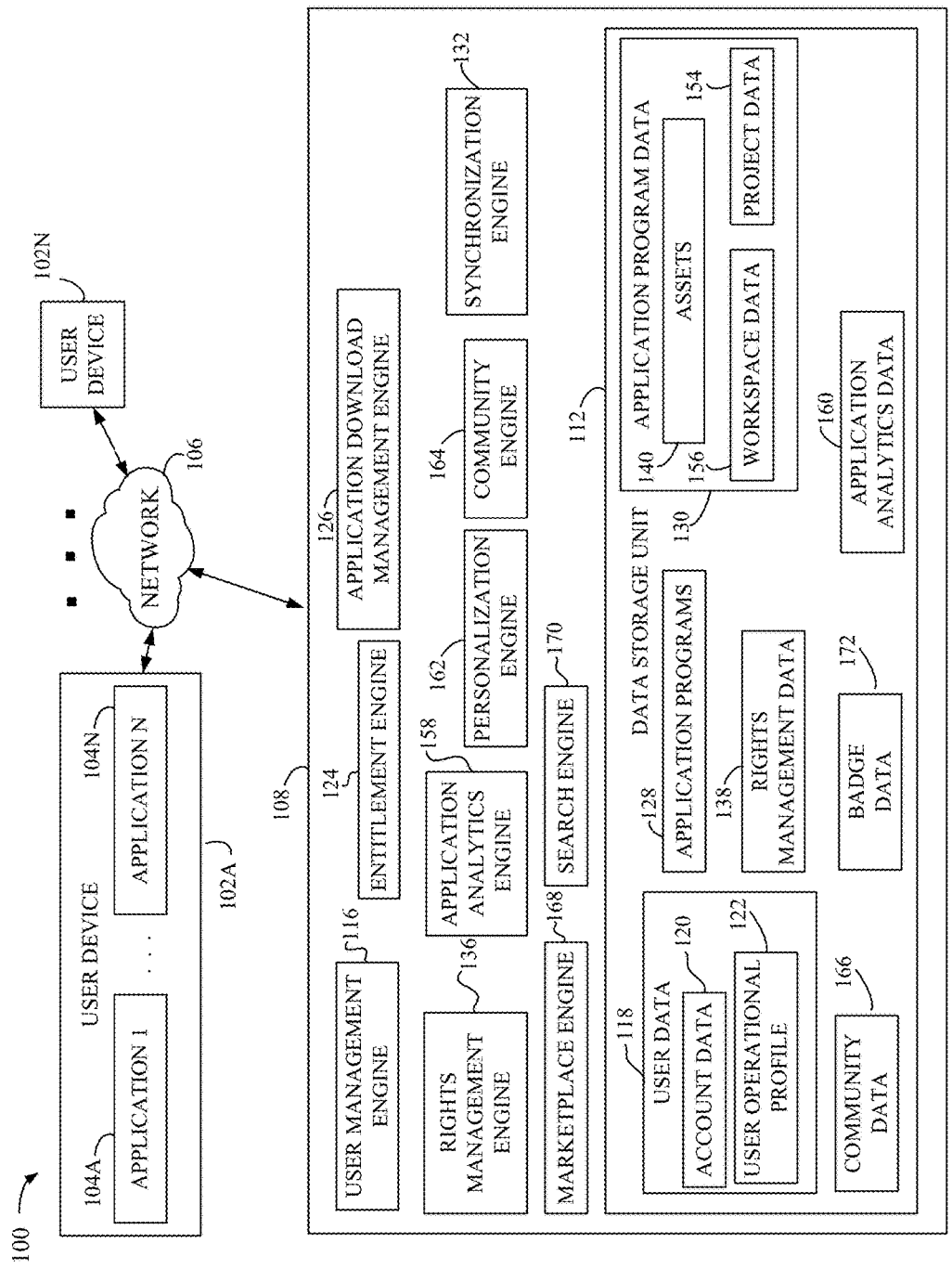
FIG. 1 is a diagram of an environment in which one or more techniques of the invention can be practiced.

Techniques disclosed herein provide context-aware badge display in online communities. Badges are identified for display based on the contexts of the online interfaces in which the badges will be displayed. Specifically, when the badges awarded to a user are to be displayed in a particular online interface, the online community of that online interface is identified and used to selectively display appropriate badges. In one example, a user posts on a website forum for a particular online community. The post will include a representation of the user such as the user's name, photo, avatar, etc. and a set of badges that the user has been awarded. These badges are identified based on the particular online community of the website forum. Badges are displayed that were awarded to the user in that particular online community of the website forum and related online communities. Badges awarded to the user in unrelated online communities are not displayed.

Techniques disclosed herein identify related online communities for badge display purposes based on a hierarchy of online communities. The positions of the online communities in the hierarchy represent their relationships to one another. Consider an example in which a site provides three online communities: a general creative content community; a photo editing community; and a desktop publishing community. In this example, the photo editing community and the desktop publishing community are organized as sub-communities of the general creative content community. This hierarchy can be created based on determining that the subject matter of the general creative content community is of interest to users in the photo editing community and of interest to users in the desktop publishing community. Alternatively, the hierarchy may be created for a purpose other than identifying relationship for badge display. For example, a site may use hierarchies to organize online communities to make it easier for users to navigate amongst online interface of multiple online communities. Techniques disclosed herein can thus use existing hierarchies of online communities to identify related online communities for badge display purposes.

When the badges awarded to a user are to be displayed in a particular online interface, the online community of that online interface and related online communities are identified and used to selectively display appropriate badges. In the example presented above, when a user posts on or otherwise interacts with an online interface in the photo editing community, the user's badges in that community and related online communities are displayed. Specifically, since the hierarchy identifies the relevance of the general creative content community to the photo editing community, the user's badges awarded in the general creative content community are also displayed. However, the user's badges awarded in the desktop publishing community are not displayed. In this example, badges are displayed using a technique that is context aware (i.e., aware of the online community of the online interface where the badges will be displayed) and that accounts for badges in related online communities using a hierarchy of online communities.

When users are awarded badges, techniques disclosed herein track the communities in which the badges are awarded. The badges are "location aware" in the sense that the source online community in which each badge was awarded can be identified. When badges are to be displayed in an online interface, techniques disclosed herein identify which of the user's badges to display based on the current context and the badge source information. Consider an example in which the user has submitted a post in a website forum of the photo editing community of above described exemplary hierarchy. In this example, the technique identifies the photo editing community based on the website forum. The technique also examines the user's badges and identifies the badges that were awarded in that online community and any related online communities. Specifically, the technique identifies badges with badge source information that identifies that the badges were awarded to the user in the photo editing community or in the general creative content community. The identified badges are then displayed with the user's post.

Different badge display rules can be implemented for different communities. In one example, a first community displays all badges regardless of the community in which the badges were awarded. A second community displays only badges awarded within the second community. A third community displays badges awarded within the third community and any of its parent communities. The badges of a user that were awarded in the three communities will be displayed differently in online interfaces of the three communities. Each community can use its own badge display rule that identifies which of a user's badges will be displayed in that community.

The badge display rule that is used by a particular community can also be changed. In one example, an online community initially displays all badges for its users. As the number of badges and online communities provided by the site grows, an administrator determines to change the badge display rule for the online community to display badges awarded within the online community and any of its parent communities, i.e., its parent community, the parent community of its parent community, etc. Later, the administrator again determines to change the rule to further reduce the number of badges displayed. The administrator changes the rule to only display badges awarded within that particular community.

Techniques of the invention provide numerous advantages over prior gamification systems. The techniques allow online communities to avoid gamification fatigue that can result when there are too many badges displayed for users. The badges that are displayed for a user can be limited based on the context of the online interface in which the badges will be displayed. Displaying fewer, more relevant badges allows those badges that are displayed to be more easily noticed, recognized, and appreciated. Techniques disclosed herein also provide flexibility. Different badge display rules can be used in different online communities. This allows a multi-community site to configure each of its online communities differently. Each community can be configured with a badge display rule to display an appropriate number of badges for its users. In addition, badge display rules can be changed. This allows communities to ensure that an appropriate number of badges is displayed for its user as the users, badges, and conditions of the online community change over time.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "online community" refers to a community whose members interact with each other primarily via online interfaces provided via the Internet and/or other electronic networks. An online community can act as an information system where users can interact with one another over time. For example, posts provided by users in an online community can be stored in a repository and accessed by users using online interfaces of the online community. An online community can be closed, i.e. limited to a number of users or to authorized users, or can be open, i.e. allowing anyone to participate.

As used herein, the phrase "online interface" refers to a user interface provided by a webpage, application, or other electronic content that enables users to interact with other users in an online community. For example, users in online communities use online interfaces to create discussions, create posts, respond to posts, submit blog entries, share content, add comments, give advice, chat with one another in chat rooms, collaborate on projects, play games together, or participate in virtual worlds together.

As used herein, the phrase "badge" refers to an award that is awarded to a user in an online community. A badge can be displayed as text, an icon, a graphic, or any other displayed representation. Badges can be earned based on a user's participation, progress, status, feedback from other users, and various other criteria. Badges can also be assigned based on a user's role. For example, a user may be assigned a "moderator" badge based on having a moderator role in an online community or an "employee" based on being an employee of an organization that provides a product or service associated with an online community.

As used herein, the phrase "badge source information" refers to any information that identifies an online community in which a badge was awarded to a user. In one example, badge source information includes a path that identifies an online community in which a badge was awarded to a user and parent communities in a hierarchy of online communities.

As used herein, the phrase "context" refers to one or more circumstances in which badges of a user will be displayed. For example, if a user's badges are to be displayed in an online interface, the context includes the online community of the online interface.

As used herein, the phrase "hierarchy" refers to an organization of online communities that identifies relationships between the online communities. For example, a hierarchy of online communities can provide an organization of four online communities (A, B, C, D) in which online community A is the parent of online communities B and C, and online community B is the parent of online community D. In this example, online community B and C are sub-communities of online community A, and online community D is a sub-community of online communities A and B. Identifying the parents of an online community can involve identifying the direct parent of the online community, the parent of that parent, and so on up the hierarchy. For example, identifying the parents of online community D can involve identifying online communities A and B as D's parent communities.

As used herein, the phrase "path" refers to chain of online communities in a hierarchy from the top of the hierarchy to a particular online community or vice versa. In the above noted example involving online communities A, B, C, and D, at path for online community D is A/B/D. In this example, the path identifies D's parent online communities A and B.

Exemplary Computing Environment

FIG. 1 is a diagram of an environment 100 in which one or more embodiments of the present disclosure can be practiced. In this exemplary embodiment, the environment enables users to engage in various creative activities and use online communities to interact with one another regarding those creative activities and for other purposes. The context-aware badge display techniques disclosed herein are applicable in numerous other computing environments. Environment 100 is provided as an example of one such environment.

The environment 100 includes an apparatus 108 that supports various creative and community functions performed by users using one or more user devices, such as a user device 102A up to a user device 102N. Each of the user devices is connected to the apparatus 108 via a network 106. Users of the user devices 102 uses various products, applications 104A-N, or services supported by the apparatus 108 via the network 106. Examples of the user devices 102A-N include, but are not limited to, a personal computer (PC), a tablet computer, a desktop computer, a processing unit, any combination of these devices, or any other suitable device having one or more processors. Each user device includes at least one application supported by the apparatus 108.

Examples of the network 106 include, but are not limited to, internet, local area network (LAN), wireless area network, wired area network, wide area network, and the like.

The apparatus 108 includes one or more engines for providing one or more digital experiences to the users 102A-N. The apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The apparatus 108 also includes a data storage unit 112. The data storage unit 112 can be implemented as one or more databases or one or more data servers. The data storage unit 112 includes data that is used by the engines of the apparatus 108.

A user of the user device 102A visits a webpage or an application store to explore applications supported by the apparatus 108. The apparatus 108 provides the applications as a software as a service (SaaS), or as a standalone application that can be installed on the user device 102A, or as a combination. The user creates an account with the apparatus 108 by providing user details and also by creating login details. Alternatively, the apparatus 108 can automatically create login details for the user in response to receipt of the user details. In some embodiments, the user is also prompted to install an application manager. The application manager enables the user to manage installation of various applications supported by the apparatus 108 and also to manage other functionalities, such as updates, subscription accounts and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on a product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user then installs various applications supported by the apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace.

The application program data 130 includes one or more assets 140. The assets 140 can be a shared asset which the user wants to share with other users or which the user wants to offer on a marketplace. The assets 140 can also be shared across multiple application programs 128.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in another embodiment.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, usage of online interfaces of an online community, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user posted on a webpage forum of an online community a number of times. The output of the application analytics engine 158 can be used to track user interactions in a community to determine awards to the user for participation in the community. The personalization engine 162 can also use the workspace data 156 or the user data 118 including user preferences to personalize one or more application programs 128 and online community online interfaces for the user.

The apparatus 108 also includes a community engine 164 which enables creation, configuration, and use of various online communities. The community engine 164 provides online interfaces that users use to interact with other users in particular online communities. For example, users who using a photo editing application provided by the creative apparatus 108 may join an online community focused on the photo editing application. The photo editing application online community allows users to interact with other users with respect to the photo editing application. As examples, the online interfaces for the photo editing application online community allow the users to create discussions, create posts, respond to posts, submit blog entries, share photos, edit one another's photos, add comments, give advice, chat with one another in chat rooms, and collaborate on photo projects.

The community engine 164 also facilitates context-aware badge display in the online interfaces of its online communities. The community engine 164 awards badges to users of the online communities and stores badge data 172 identifying badge source information for the badges. The badge source information can then be used to determine whether a given badge will be displayed in a particular context. A badge awarded to a user may be displayed in one online community but not another online community based on the badge source information. The community engine 166 can also store data corresponding to the online communities as community data. The community data 166 can include posts, discussions, blog entries, comments, shared content, community configuration settings, and various other elements of information related to each of the online communities. The community data 166 can also include a hierarchy of the online communities provided by the community engine 164. The hierarchy of online communities identifies relationships between the online communities that are used in providing badges for display and/or other purposes. The community data 166 can also include notification data used for notifying users of the community about community activities. For example, a user may post a question in an online forum and receive a notice when another user posts a response.

Figure 2:
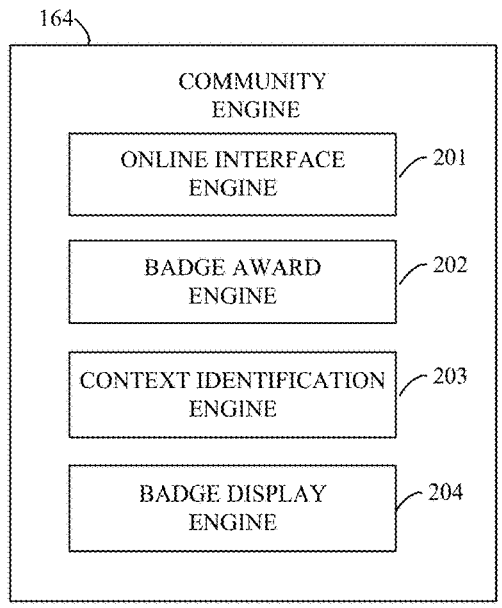
FIG. 2 is a block diagram of an exemplary community engine configured to perform one or more techniques of the invention.

FIG. 2 is a block diagram of an exemplary community engine 164 configured to perform one or more techniques of the invention. In this example the community engine 164 includes an online interface engine 201, a badge award engine 202, a context identification engine 203, and a badge display engine 204. The online interface engine 201 provides online interfaces that users use to interact with other users in an online community. For example, the online interface engine 201 can provide an online interface by building and serving a webpage to users in the community. Such a webpage can include content from users in the community and/or facilitate interactions between the users in the community. For example, the webpage may provide a forum in which users in the community can post comments and read comments posted by other users in the community. The posted comments can include information about the users who posted the comments. For example, a comment may include a name, picture, and or the badges awarded to a user who posted the comment.

The badge award engine 202 determines badges to award to the users of the online communities of the community engine 164. Badges can be awarded based on user provided credentials. For example, an "employee" badge can be awarded based on credentials provided by a user that authenticate the user as an employee. Badges can be awarded based on roles that users volunteer for or are assigned. For example, a "moderator" badge can be assigned to a user who has volunteered to act as a moderator in the online community. Badges can also be earned based on user participation in the online community. For example, the badge award engine 202 may track the number of posts, comments, likes, and other interactions that a user provides and award badges based on those actions. The badge award engine 202 can also award badges to users based on feedback from other users. For example, a user may receive badges based on other user's commenting or liking posts, comments, or other comment submitted by the user in the online community. An administrator can configure the badge award engine 202 with badge awarding rules for awarding badges under different circumstances in the different online communities. For example, a user may earn a community 1 gold badge in one community for contributing 100 posts and a community 2 gold badge in another community for contributing 200 posts.

The context identification engine 203 identifies the context of online interfaces that are provided for the online communities. Specifically, the context identification engine 203 identifies the online community to which an online interface relates. When an online interface is to be displayed, the context identification engine 203 determines this context and provides it to the badge display engine 204 to determine appropriate badges for the online interface. The badge display engine 204 uses the context to identify appropriate badges based on the badge source information of the badges. In one embodiment, the badge display engine 204 identifies badges to display based on a badge display rule. For example, the badge display rule for a community may specify that only badges awarded in the online community of the online interface and related online communities are to be displayed. In this case, the badge display engine 204 identifies related online communities and then identifies badges awarded in the online community of the online interface and in those related online communities.

Returning to FIG. 1, the apparatus 108 also includes a marketplace engine 168 for providing a marketplace to one or more users. The marketplace engine 168 enables the user to offer an asset for sale or use. The marketplace engine 168 has access to the assets 140 that the user wants to offer on the marketplace. The apparatus 108 also includes a search engine 170 to enable searching of the assets 140 in the marketplace. The search engine 170 is also a part of one or more application programs 128 to enable the user to perform search for the assets 140 or any other type of the application program data 130.

It is to be appreciated that the engines and working of the engines are described as examples herein and the engines can be used for performing any step in providing a digital experience to the user.

Embodiments of the invention provide techniques, systems, and computer-readable mediums with stored instructions that enable context-aware badge display in online communities. The functions involved in these embodiments of the invention generally involve storing badges awarded to one or more users and badge source information, identifying the context of an online interface in which a representation of the user will be displayed, and providing the representation and selected badges for display in the online interface. These functions are generally implemented on one or more computing devices that use one or more processors to execute algorithms of one or more operations defined in stored instructions. The computing devices that perform these functions can be located on a user's local computing device, such as on user device 102A, and/or on a remote computing device, such as on apparatus 108 of FIG. 1. The operations of various exemplary algorithms that can be employed to perform these functions are discussed throughout this specification.

Exemplary Techniques for Context-Aware Badge Display in Online Communities

Figure 3:
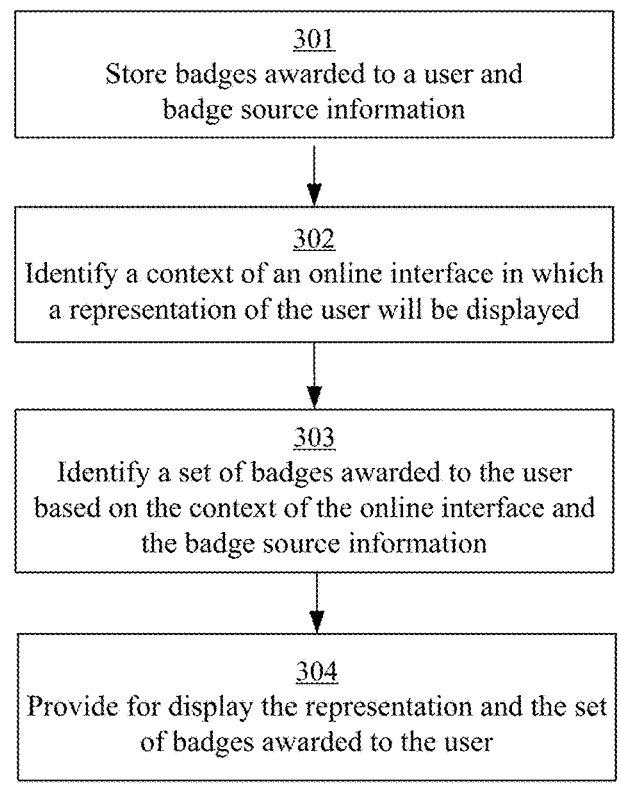
FIG. 3 is a flow chart illustrating an exemplary technique for context aware badge display.

FIG. 3 is a flow chart illustrating an exemplary technique 300 for context aware badge display. The exemplary technique 300 can be implemented by user device 102A and/or apparatus 108, although other devices and configurations can also be implemented. The exemplary technique 300 can be implemented by storing and executing instructions in a non-transitory computer-readable medium. Reference to the technique 300 being performed by a computing device includes the technique 300 being performed by one or more computing devices.

Technique 300 involves storing badges awarded to a user and badge source information, as shown in block 301. The type of information stored to store a badge awarded to a user can vary depending on the implementation. The badge information can include one or more of a unique identifier of the badge, a name of the badge, criteria for earning the badge, an icon used to represent the badge in online interfaces, the user identity who was awarded the badge, and/or other information about a badge that has been awarded to a user. Badges are awarded at the online community level. For example, scoring and badging rules can be configured to individual communities so that scores and badges are awarded within individual communities. The badge source information can include any information that identifies an online community in which a badge was awarded to a user. In one example, badge source information includes a path that identifies an online community in which a badge was awarded to a user and parent communities in a hierarchy of online communities. Badges and badge source information for one or more users can be stored together, for example, in a database. The badges and badge source information are stored together in one embodiment and separately in another embodiment. The badge source information is stored as metadata of the badges in one embodiment.

Technique 300 further involves identifying a context of an online interface in which a representation of the user will be displayed, as shown in block 302. The representation of the user can include one or more of a name of the user, a role of the user, a unique identifier of the user, a photo of the user, an icon representing the user, and/or any other text or graphics that represents the user's identity in an online community. For example, when a user posts in a webpage forum, the user's post can include the user's name and photo of the user to identify to the other users of the forum the user who provided the posted content. Online interfaces are provided to users of online communities in various ways. For example, an online interface can be provided via a webpage that is provided to one or more users of the community. The webpage can include user-provided content such as comments, posts, discussions, creative content, etc. and the webpage content may change over time. The context of such a webpage can be identified in various ways. For example, the content of the webpage and/or metadata about the webpage may identify the online community to which the webpage relates. Technique 300 can involve parsing the content of a webpage and/or its metadata to identify the context of the webpage. Additionally, or alternatively, online interface and their associated online communities can be stored in a table, database or other reference electronic content. The context of an online community can then be determined, when needed, by looking up the associated online community. In another example, an online interface is provided by an app on a mobile device. For example, the app may provide online interfaces for each of several online communities. The context of the online interfaces provided by such an app can be determined by examining the content and/or metadata of the online interfaces or looked up using a databased, table, or other reference content.

The technique 300 further involves identifying a set of badges awarded to the user based on the context of the online interface and the badge source information, as shown in block 303. In one example, the context of the online interface is online community A and the set of badges that are identified include only badges that have badge source information identifying that the badges were awarded in online community A. In another example, the badges that are identified for the set include those badges and badges awarded to the user in another online community that is determined to be related to online community A.

The technique 300 further involves providing for display the representation and the set of badges awarded to the user, as shown in block 304. The representation of the user and the set of badges are displayed in the online interface. In one example, providing the representation and the set of badges for display involves including the representation and the badges in the content of the webpage that provides an online interface. In another example, providing the representation and the set of badges for display involves including the representation and the badges in the content of an online interface provided by an app. In one embodiment, the badges are displayed with display characteristics that are determined based on the context of the online interface. For example, badges awarded to the user in the online community of the online interface may be displayed larger than badges awarded to the user in related online communities.

Technique 300 can display badges based on the context of an online interface at different points during the use of an online interface. For example, when a user first accesses an online interface, initially the online interface may include posts from users 1, 2, and 3. The badges for each of these users can be determined and displayed based on the context of the online interface. The online interface can change over time, for example, as additional posts are received from the users in the community. When a post from user 4 is received, the online interface is updated with the content of the post, a representation of user 4, and badges awarded to user 4 that are selected and displayed based on the context of the online interface.

Figure 4:
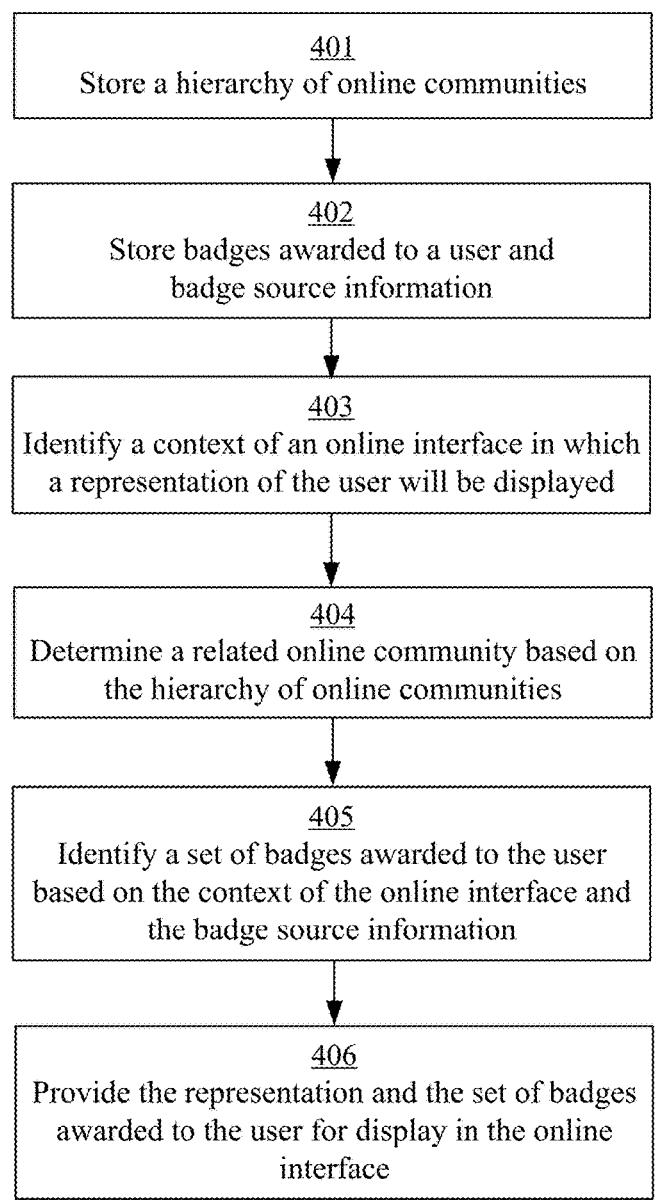
FIG. 4 is a flow chart illustrating an exemplary technique for context aware badge display that uses a hierarchy of online communities to identify which badges to display.

FIG. 4 is a flow chart illustrating an exemplary technique 400 for context aware badge display that uses a hierarchy of online communities to identify which badges to display. The exemplary technique 400 can be implemented by user device 102A and/or apparatus 108, although other devices and configurations can also be implemented. The exemplary technique 400 can be implemented by storing and executing instructions in a non-transitory computer-readable medium. Reference to the technique 400 being performed by a computing device includes the technique 400 being performed by one or more computing devices.

The technique 400 involves storing a hierarchy of online communities, as shown in block 401. The hierarchy generally identifies relationships between the online communities. In one embodiment, sub-communities are organized under parent online communities to form a tree structure of online communities. Consider an example of a site that provides online communities for a cloud service that provides 5 different cloud-based applications for users to create different forms of creative content, e.g., a photo editing app, an image creation app, a video editing app, an audio editing app, and a webpage creation app. The site can provide an online communities for users of these apps. For example, the site may provide a general creative cloud content online community, an online community for each of the cloud-based applications, and online communities for tools used within the particular apps. These communities can be organized in a hierarchy that is based on the relationships between them. The hierarchy can be identified based on user input identifying relationships or identified over time based on commonalities (such as common users) within the online communities. In one example, the hierarchy includes the general creative cloud content online community at the top and then the online communities for each of the five apps as sub-communities of that top-level online community. In this organization, the general creative cloud content online community is a parent community of each of the online communities for the 5 apps. In this example, a "layers" online community is organized as a sub-community under the photo editing online community. Thus the photo editing online community is the parent of the layers community.

The technique 400 stores badges awarded to a user and badge source information, as shown in block 402, and identifies a context of an online interface in which a representation of the user will be displayed, as shown in block 403. These elements can involve similar features as element 301 and 302 of FIG. 3, respectively.

The technique 400 determines a related online community based on the hierarchy of online communities, as shown in block 404. The context of the online interface identifies the online community of the online interface. One or more communities are identified as related to that online community using the hierarchy. Which communities in the hierarchy are related depends on the badge display rule that is used. For example, if the badge display rule specifies to display badges awarded in the parent communities, those online communities will be considered related to the online community of the online interface. In the example above, if the online community of the online interface is the layers online community, the parent online community (i.e., the photo editing online community) and its parent community (i.e., the general creative cloud online community) will be identified as related communities.

The technique 400 identifies a set of badges awarded to the user based on the context of the online interface and the badge source information, as shown in block 405. The badges identified for the set of badges depends upon the badge display rule used by the online community of the online interface. For example, if the badge display rule specifies to display badges awarded in parent communities, then badges from those related online communities will be included in the set. In the example above, if the online community of the online interface is the layers online community, the set of badges will include badges awarded to the user in the layers online community, the photo editing online community, and the general creative cloud online community. Badges awarded to the user in the other online communities, such as those awarded in the audio editing online community, will not be included in the set of badges.

The technique 400 provides the representation and the set of badges awarded to the user for display in the online interface, as shown in block 406. This element can involve similar features as element 304 of FIG. 3.

Figure 5:
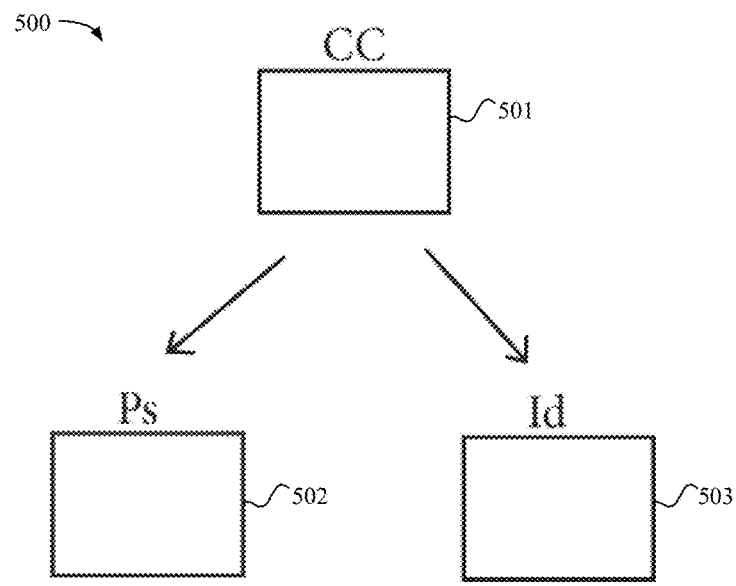
FIG. 5 is a block diagram representing an exemplary hierarchy of online communities.

FIG. 5 is block diagram representing an exemplary hierarchy 500 of online communities. In this example, the hierarchy 500 includes a general creative cloud (CC) online community 501 that provides online interfaces that allow users to interact with other users regarding general topics in the creative cloud environment. In the hierarchy 500, the CC online community 501 is the parent of two sub-communities. The first sub-community is a photo editing (Ps) online community 502 that provides online interface that allow users to interact with other users regarding a photo editing application, such as the Adobe® Photoshop® application. The second sub-community is a desktop publishing (Id) online community that provides online interfaces that allow users to interact with other users regarding a desktop publishing application, such the Adobe® InDesign® application. In the example of FIG. 5, the hierarchy 500 represents relationships between the online communities 501, 502, 503, that are used in context-specific badge display.

Techniques disclosed herein store badge source information for a badge awarded in an online community. The badge source information identifies the online community. The badge source information additionally or alternatively identifies a path to the online community in the hierarchy 500. For example, metadata stored for badges awarded to a user in each of the online communities 501, 502, 503 can identify "/CC", "/CC/Ps", and "/CC/Id", respectively. This location metadata reflects the location where the badges were awarded and parent/related online communities in the hierarchy 500.

Figure 6:
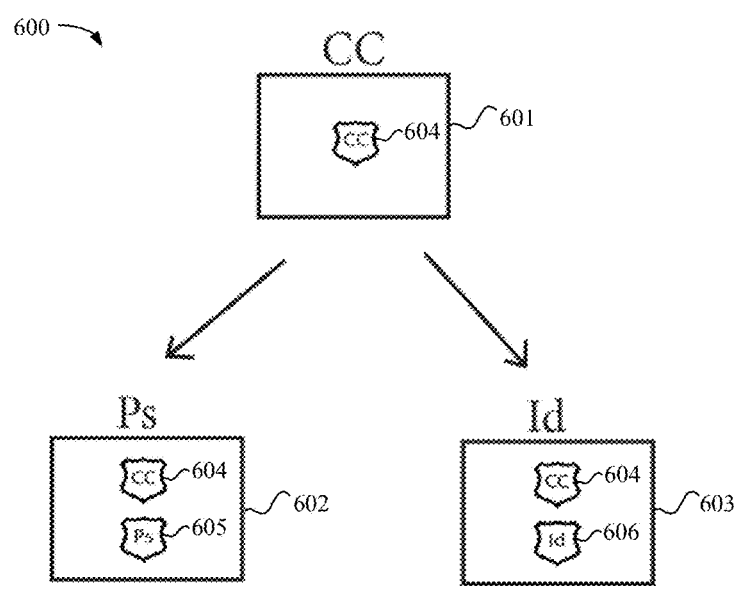
FIG. 6 is a block diagram representing badges that will be displayed in each of the online communities of the hierarchy of FIG. 5 given a badge display rule.

FIG. 6 is a block diagram representing badges that are displayed in online interfaces of each of the online communities of the hierarchy of FIG. 5 given a badge display rule. The badge display rule specifies that badges awarded in the online community of an online interface and badges awarded in parent online communities are to be displayed. FIG. 6 depicts that when the context of an online interface 601 is the CC online community, only badges 604 from the CC online community are displayed. The CC online community does not have any parent online communities in the hierarchy. However, when the context of an online interface 602 is the Ps online community, badges 605 from the Ps online community and badges 604 from the CC online community are displayed. Badges 606 from the Id online community are not displayed. Similarly, when the context of an online interface 603 is the Id online community, badges 606 from the Id online community and badges 604 from the CC online community are displayed. Badges 605 from the Ps online community are not displayed.

Techniques disclosed herein identify which badges to display in a particular context based on the badge source information stored for the badges. For example, if the badge source information identifies the path to each online community in the hierarchy 500, e.g., "/CC", "/CC/Ps", and "/CC/Id," badges can be identified using those paths. The badges can be identified by searching for all of the user's badges and filtering out badges to show only badges with a badge source path starting with the path of the online community of the online interface. For example, the following pseudo code filters out badges not to be displayed from a pool of all badges: !badgePagePath.startsWith(curentPagePath)||badgePagePath.length( )> currentPagePath.length( ). This pseudo code identifies badges awarded in online communities with different parent online communities and excludes those badges from display. It also identifies badges awarded in child/sub-communities of the online community of the online interface and excludes those badges from display.

Figure 7:
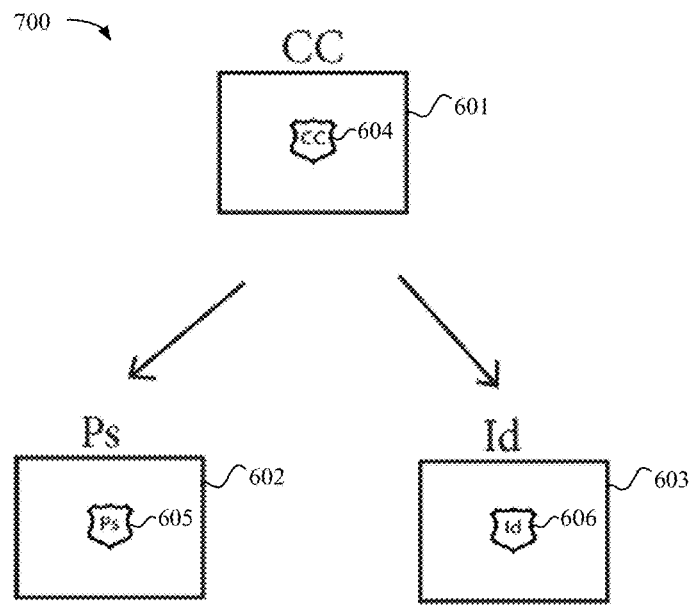
FIG. 7 is a block diagram representing badges that will be displayed in each of the online communities of the hierarchy of FIG. 5 given another badge display rule.

FIG. 7 is a block diagram 700 representing badges that are displayed in online interfaces of each of the online communities of the hierarchy of FIG. 5 given another badge display rule. The badge display rule specifies that only badges awarded in the online community of an online interface are to be displayed. FIG. 7 depicts that when the context of an online interface 601 is the CC online community, only badges 604 from the CC online community are displayed. When the context of an online interface 602 is the Ps online community, only badges 605 from the Ps online community are displayed. When the context of an online interface 603 is the Id online community, only badges 606 from the Id online community are displayed.

If the badge source information identifies the path to each online community in the hierarchy 500, e.g., "/CC", "/CC/Ps", and "/CC/Id," badges can be identified using the paths. The badges are identified by identifying all badges where the path of the badge is equal to the path of online community of the online interface.

Figure 8:
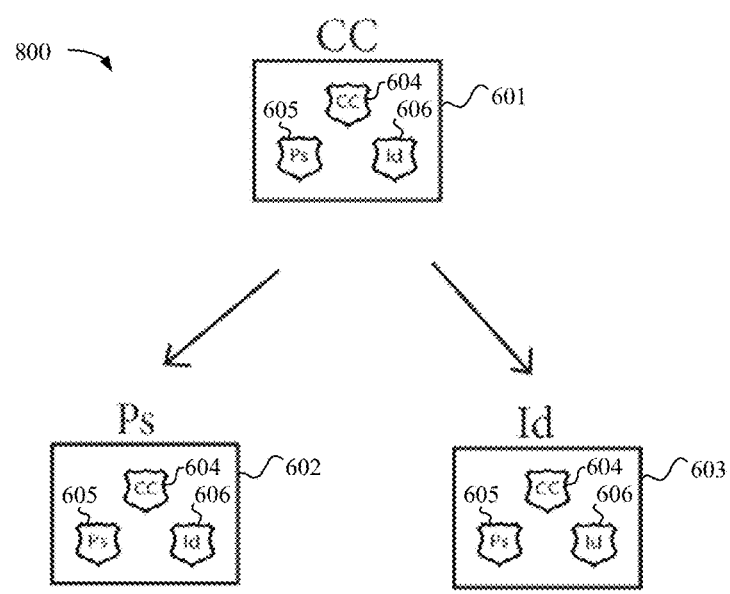
FIG. 8 is a block diagram representing badges that will be displayed in each of the online communities of the hierarchy of FIG. 5 given another badge display rule.

FIG. 8 is a block diagram 800 representing badges that will be displayed in online interfaces of each of the online communities of the hierarchy of FIG. 5 given another badge display rule. The badge display rule specifies that all badges awarded are to be displayed. FIG. 8 depicts that when the context of an online interface 601 is the CC online community, badges 604, 605, 606 from the CC online community, Ps online community, and Id online community are displayed. Similarly, when the context of an online interface 602 is the Ps online community, badges 604, 605, 606 from the CC online community, Ps online community, and Id online community are displayed. And, when the context of an online interface 603 is the Id online community, badges 604, 605, 606 from the CC online community, Ps online community, and Id online community are displayed.

If the badge source information identifies the path to each online community in the hierarchy 500, e.g., "/CC", "/CC/Ps", and "/CC/Id," badges can be identified using the paths. The badges are identified by simply not filtering out any badges so that all badges awarded to the user are displayed.

FIGS. 5-8 illustrate examples of different badge display rules used to display badges based on the contexts of online interfaces of online communities. The badges used by individual online communities can differ from one another. For example, CC online community 501 may use the badge display rule illustrated in FIG. 8, the Ps online community 502 may use the badge display rule illustrated in FIG. 6, and the Id community 503 may use the badge display rule illustrated in FIG. 7. The particular badge display rule used by an online community can be manually specified or automatically determined based on criteria.

Figure 9:
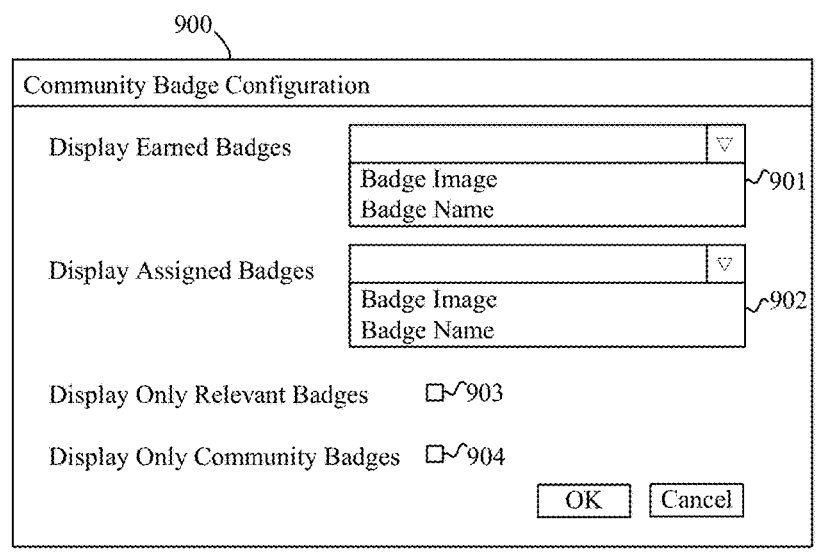
FIG. 9 is a block diagram depicting an exemplary user interface for an administrator to configure badge display properties for an online community.

FIG. 9 is a block diagram depicting an exemplary user interface 900 for an administrator to configure badge display properties for an online community. In this example the user interface 900 allows the administrator to configure an individual community. The user interface 900 allows the administrator to specify to display earned badges using a badge image or a badge name using user interface option 901. Similarly, the user interface 900 allows the administrator to specify to display assigned badges using a badge image or a badge name using user interface option 902.

The user interface 900 also provides an option 903 for displaying only relevant badges. Selecting this option 903 to display only relevant badges for the online community configures the online community so that only badges awarded in the online community and related online communities will be displayed. The related online communities in this example are identified based on relationships in a hierarchy of online communities. The user interface 900 also provides an option 904 for displaying only community badges. Selecting this option 904 to display only community badges configures the online community so that only badges awarded in the online community interface are displayed. If neither options 903, 904 are selected, then the online community is configured by default to display all badges awarded to the user in any of the online communities. Accordingly, user interface 900 allows an administrator to configure an online community to have one of three different badge display rules. The user interface 900 also allows the administrator to separately configure other online community with the same badge display rule or a different badge display.

Figure 10:
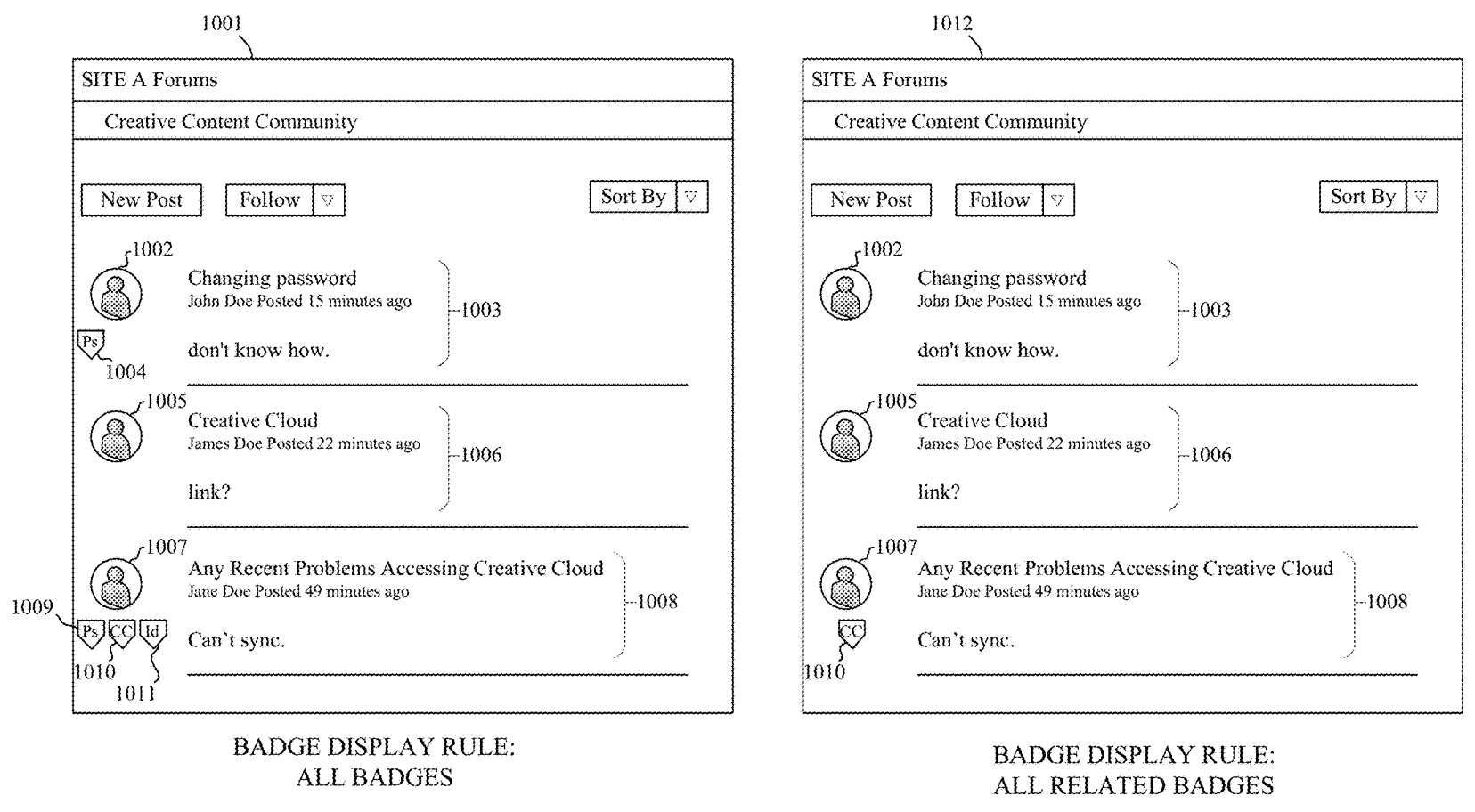

FIG. 10 is a block diagram depicting an example of badge display in an online interface of an online community for different badge display rules. In this example, a first online interface 1001 is displayed based on a badge display rule that specifies that all badges are to be displayed. The first online interface 1101 is in the CC online community of the hierarchy of FIG. 5. In this example, a first user's post 1003 includes an image 1002 and a name "John Doe" representing the identity of the first user. The post 1003 also include a badge 1004 that was awarded to the first user in the Ps online community. A second user's post 1006 includes an image 1002 and a name "James Doe" representing the identity of the second user, but does not include any badges for the second user. A third user's post 1008 includes an image 1007 and a name "Jane Doe" representing the identity of the third user and badges 1009, 1010, 1011 awarded to the third user. Badge 1009 was awarded to the third user in the Ps online community. Badge 1010 was awarded to the third user in the CC online community. Badge 1011 was awarded to the third user in the Id online community. Since the badge display rule specifies that all of each user's badges are to be displayed, all of the badges of the first, second, and third users are displayed in the online interface 1001.

In contrast, the second online interface 1012 is displayed based on a badge display rule that specifies that all related badges are to be displayed. Thus only badges in the online community of the online interface and its parent communities are displayed. Thus, in contrast to the first online interface 1001, badges 1004, 1009 1011 are not displayed since these badges were not awarded in the CC online community. Only badge 1010 is displayed since it was awarded in the CC online community.

Figure 11:
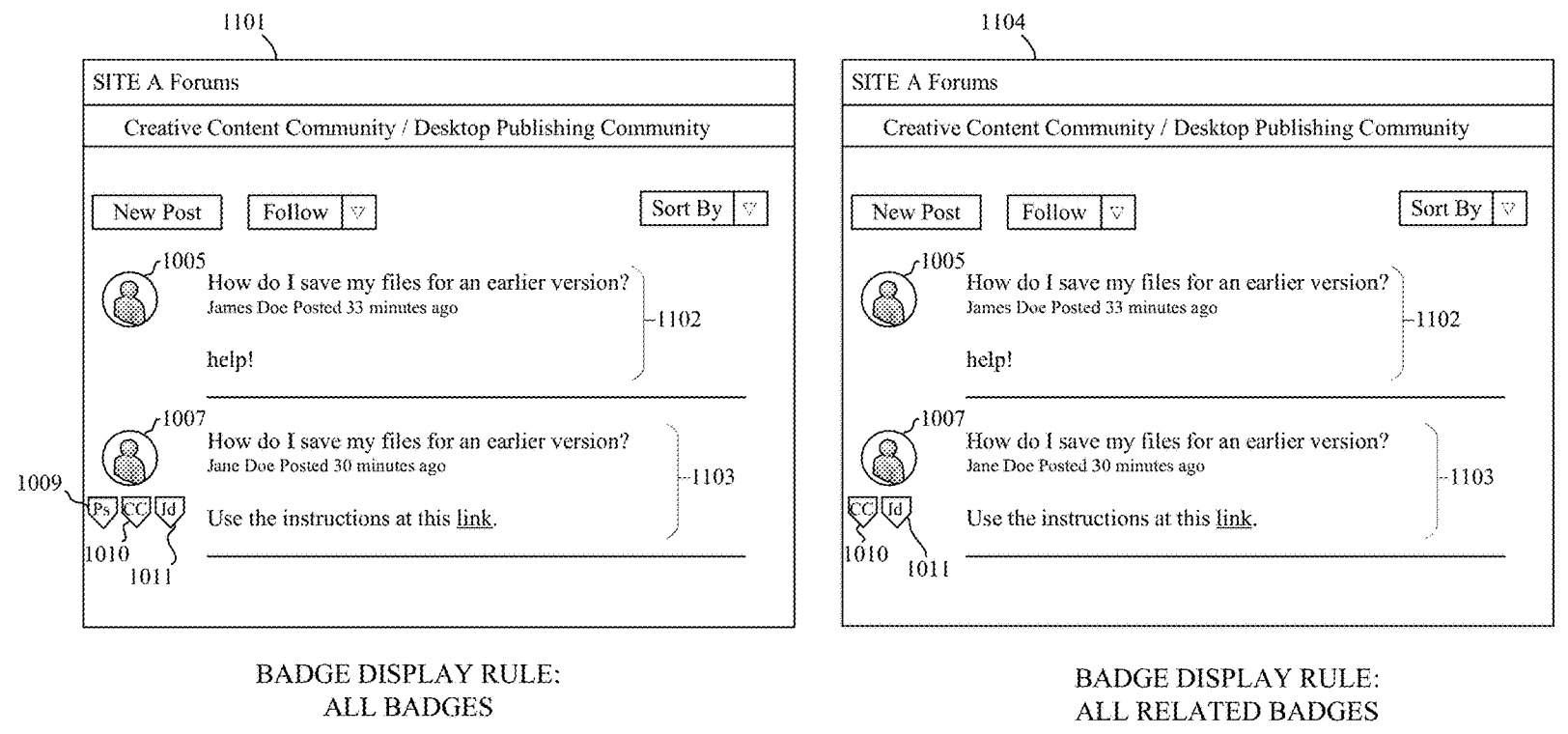

FIG. 11 is a block diagram depicting another example of badge display in an online interface of an online community for different badge display rules. In this example, a third online interface 1101 is displayed based on a badge display rule that specifies that all of each user's badges are to be displayed. The third online interface 1101 is in the Id online community, which is a sub-community of the CC online community in the hierarchy of FIG. 5. In this example, the second user's post 1102 includes an image 1005 and the name "James Doe" representing the identity of the second user. The post 1102 does not include any badges. The third user's post 1103 includes the image 1007 and the name "Jane Doe" representing the identity of the third user and badges 1009, 1010, 1011 awarded to the third user. Badge 1009 was awarded to the third user in the Ps online community. Badge 1010 was awarded to the third user in the CC online community. Badge 1011 was awarded to the third user in the Id online community. Since the badge display rule specifies that all of each user's badges are to be displayed, all of the badges of the second and third users are displayed in the online interface 1101.

In contrast, the fourth online interface 1104 is displayed based on a badge display rule that specifies that all related badges are to be displayed. Thus only badges in the online community of the online interface and its parent communities are displayed. Thus, in contrast to the third online interface 1101, badge 1009 is not displayed since that badge was not awarded in the Id online community or in its parent online community, the CC online community. Badges 1010, 1011 are displayed since these badges were each awarded in the Id online community or in its parent online community, the CC online community.

Figure 12:
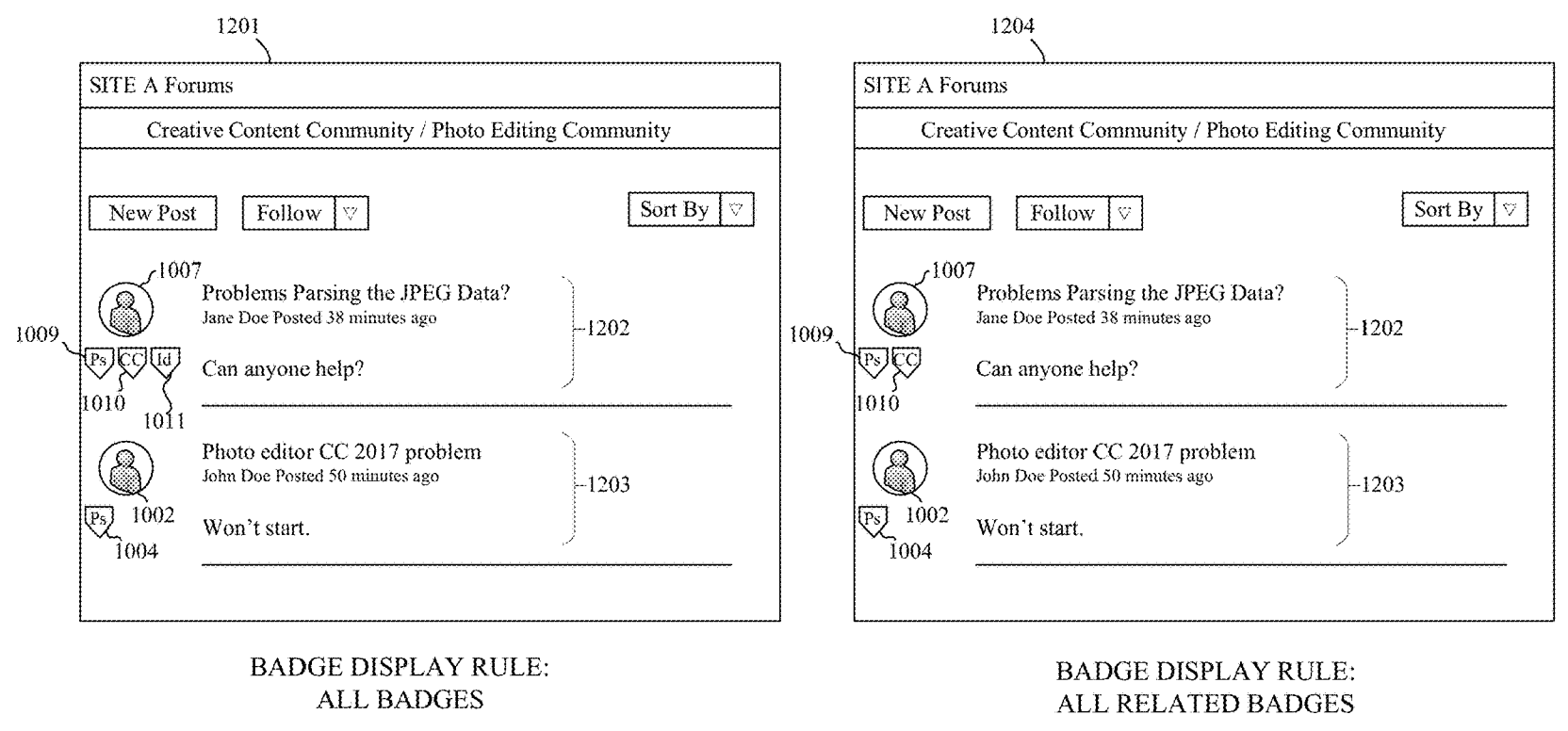

FIG. 12 is a block diagram depicting another example of badge display in an online interface of an online community for different badge display rules. In this example, a fifth online interface 1201 is displayed based on a badge display rule that specifies that all of each user's badges are to be displayed. The fifth online interface 1201 is in the Ps online community, which is a sub-community of the CC online community in the hierarchy of FIG. 5. In this example, the third user's post 1202 includes the image 1007 and the name "Jane Doe" representing the identity of the third user and badges 1009, 1010, 1011 awarded to the third user. Badge 1009 was awarded to the third user in the Ps online community. Badge 1010 was awarded to the third user in the CC online community. Badge 1011 was awarded to the third user in the Id online community. The first user's post 1203 includes an image 1002 and the name "John Doe" representing the identity of the first user. The post 1003 also includes badge 1004 that was awarded to the first user in the Ps online community. Since the badge display rule specifies that all of each user's badges are to be displayed, all of the badges of the first and third users are displayed in the online interface 1201.

In contrast, the sixth online interface 1204 is displayed based on a badge display rule that specifies that all related badges are to be displayed. Thus only badges in the online community of the online interface and its parent communities are displayed. Thus, in contrast to the fifth online interface 1201, badge 1011 is not displayed since that badge was not awarded in the Ps online community or in its parent online community, the CC online community. Badges 1004, 1009, 1010 are displayed since these badges were each awarded in the Ps online community or in its parent online community, the CC online community.

Exemplary Computing Device

Figure 13:
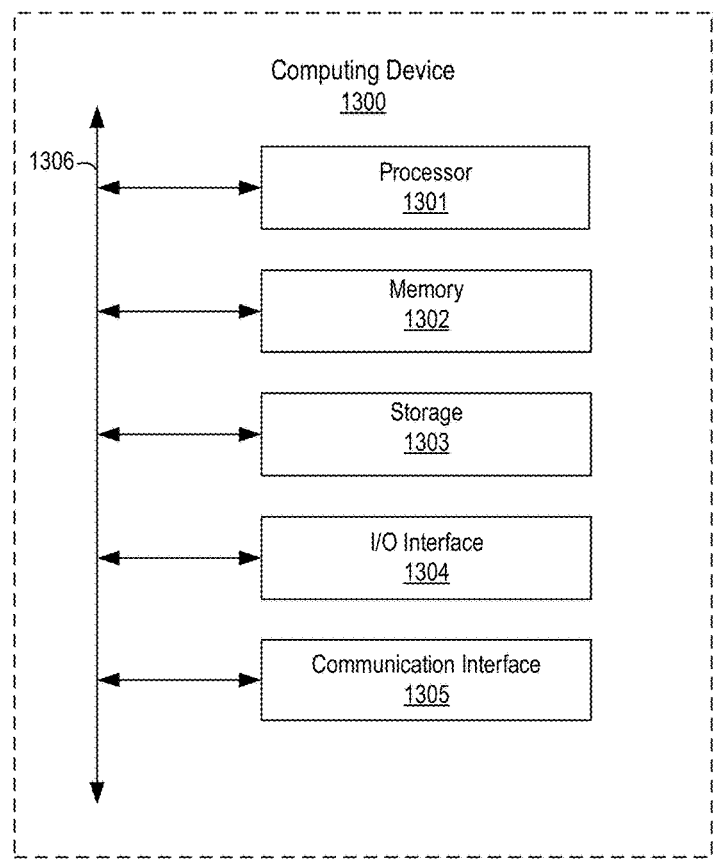
FIG. 13 is a block diagram depicting an example hardware implementation.

Any suitable computing system or group of computing systems can be used to implement the techniques and methods disclosed herein. For example, FIG. 13 is a block diagram depicting examples of implementations of such components. The computing device 1300 can include a processor 1301 that is communicatively coupled to a memory 1302 and that executes computer-executable program code and/or accesses information stored in memory 1302 or storage 1303. The processor 1301 may comprise a microprocessor, an application-specific integrated circuit ("ASIC"), a state machine, or other processing device. The processor 1301 can include one processing device or more than one processing device. Such a processor can include or may be in communication with a computer-readable medium storing instructions that, when executed by the processor 1301, cause the processor to perform the operations described herein.

The memory 1302 and storage 1303 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1300 may also comprise a number of external or internal devices such as input or output devices. For example, the computing device is shown with an input/output ("I/O") interface 1304 that can receive input from input devices or provide output to output devices. A communication interface 1305 may also be included in the computing device 1300 and can include any device or group of devices suitable for establishing a wired or wireless data connection to one or more data networks. Non-limiting examples of the communication interface 1305 include an Ethernet network adapter, a modem, and/or the like. The computing device 1300 can transmit messages as electronic or optical signals via the communication interface 1305. A bus 1306 can also be included to communicatively couple one or more components of the computing device 1300.

The computing device 1300 can execute program code that configures the processor 1301 to perform one or more of the operations described above. The program code can include one or more modules. The program code may be resident in the memory 1302, storage 1303, or any suitable computer-readable medium and may be executed by the processor 1301 or any other suitable processor. In some embodiments, modules can be resident in the memory 1302. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for providing badges for display in online interfaces used by online communities, the method comprising:
    storing badges awarded to one or more users, wherein storing the badges awarded to the one or more users comprises storing badge source information identifying in which online community individual badges were awarded to the one or more users, wherein the online communities are included in a hierarchy of online communities that are related by paths from a website, and the badge source information specifies at least one path of the paths;
    identifying a context of an online interface in which a representation of a user will be displayed, the context identifying an online community of the online interface;
    determining a related online community that is related to the online community based on positions of the online community and the related online community within the hierarchy of online communities;

identifying a set of badges for display with the representation based on the context and the badge source information, wherein identifying the set of badges comprises identifying badges awarded to the user in the online community and the related online community; and providing the representation and the set of badges for display in the online interface.

2. The method of claim 1, wherein identifying the set of badges further comprises identifying a badge display rule and identifying badges for the set based on the badge display rule.

3. The method of claim 2, wherein identifying the badges based on the badge display rule comprises identifying badges that were awarded to the user in related online communities, wherein the related online communities include parent online communities of the online community in the hierarchy that share the at least one path.

4. The method of claim 3, wherein identifying the badges based on the badge display rule comprises excluding badges that were awarded in sub-communities of the online community in the hierarchy.

5. The method of claim 2 further comprising:

receiving input replacing the badge display rule with a second badge display rule for the online community, the second badge display rule different from the badge display rule;

identifying a second set of badges for display with the representation based on the second badge display rule; and providing the representation and the second set of badges for display in the online interface of the online community.

6. The method of claim 5, wherein identifying badges based on the second badge display rule comprises identifying only badges awarded in the online community.

7. The method of claim 5, wherein identifying badges based on the second badge display rule comprises identifying badges awarded in any of the online communities in the hierarchy.

8. The method of claim 1 further comprising:

receiving input identifying different badge display rules for different online communities in the hierarchy; and displaying badges awarded to the user differently in online interfaces of the different online communities based on the different badge display rules.

9. The method of claim 1, wherein identifying the context of the online interface comprises identifying the online community associated with a web page providing a chat room or forum as the online interface.

10. A system for providing badges for display in online interfaces used by online communities, the system comprising:

a means for storing badges awarded to one or more users and badge source information identifying in which online community individual badges were awarded to the one or more users, wherein the online communities are included in a hierarchy of online communities that are related by paths from a website, and the badge source information specifies at least one path of the paths;

a means for identifying a context of an online interface in which a representation of a user will be displayed, the context identifying an online community of the online interface;

a means for determining a related online community that is related to the online community based on positions of the online community and the related online community within the hierarchy of online communities; and a means for providing for display the representation and a set of badges awarded to the user in the online community and the related online community, the set of badges identified based on the context and the badge source information.

11. The system of claim 10, wherein the means for providing for display the representation and the set of badges determines the related online community by identifying a parent online community of the online community in the hierarchy of online communities.

12. The system of claim 10, wherein the means for providing for display the representation and the set of badges identifies the set of badges by identifying only badges awarded in the online community.

13. The system of claim 10, wherein the means for providing the representation and the set of badges identifies the set of badges by identifying badges awarded in any of the online communities in a hierarchy of online communities.

14. The system of claim 10 further comprising a means for receiving input identifying different badge display rules for different online communities, wherein badges awarded to the user are displayed differently in online interfaces of the different online communities based on the different badge display rules.

15. A non-transitory computer-readable medium storing instructions, the instructions comprising instructions for:

storing badges awarded to one or more users, wherein storing the badges awarded to the one or more users comprises storing badge source information identifying in which online community of a plurality of online communities individual badges were awarded to the one or more users, wherein the plurality of online communities are included in a hierarchy of online communities that are related by paths from a website, and the badge source information specifies at least one path of the paths;

identifying a context of an online interface in which a representation of a user will be displayed, the context identifying an online community of the online interface;

determining a related online community that is related to the online community based on positions of the online community and the related online community within the hierarchy of online communities;

identifying a set of badges for display with the representation based on the context of the user interaction and the badge source information, wherein identifying the set of badges comprises identifying badges awarded to the user in the online community and badges awarded to the user in the related online community; and providing the representation and the set of badges for display in the online interface of the online community.

16. The non-transitory computer-readable medium of claim 15, wherein identifying the set of badges comprises identifying a badge display rule and identifying badges for the set based on the badge display rule.

\* \* \* \* \*